(12) United States Patent
Nakanishi et al.

(10) Patent No.: US 8,676,014 B2
(45) Date of Patent: Mar. 18, 2014

(54) OPTICAL FIBER AND METHOD OF MANUFACTURING OPTICAL FIBER

(75) Inventors: Tetsuya Nakanishi, Yokohama (JP); Masaaki Hirano, Yokohama (JP); Tetsuya Haruna, Yokohama (JP); Maki Ikechi, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 521 days.

(21) Appl. No.: 12/903,798

(22) Filed: Oct. 13, 2010

(65) Prior Publication Data

US 2011/0085768 A1 Apr. 14, 2011

(30) Foreign Application Priority Data

Oct. 14, 2009 (JP) ................. 2009-237313

(51) Int. Cl.
*G02B 6/02* (2006.01)

(52) U.S. Cl.
USPC .............................. 385/123; 385/37; 385/141

(58) Field of Classification Search
USPC .......................................................... 385/123
See application file for complete search history.

(56) References Cited

U.S. PATENT DOCUMENTS

| 4,243,298 A * | 1/1981 | Kao et al. ..................... 385/128 |
| 5,057,781 A | 10/1991 | Atkins et al. |
| 2009/0180103 A1 | 7/2009 | Kim et al. |

FOREIGN PATENT DOCUMENTS

| CN | 1680836 | 10/2005 |
| EP | 1 318 369 | 6/2003 |
| JP | 60-055304 | 3/1985 |
| JP | 2-27308 | 1/1990 |
| JP | 4-65327 | 3/1992 |
| JP | 5-124831 | 5/1993 |
| JP | 2009-168813 | 7/2009 |

OTHER PUBLICATIONS

S.M. Oh et al., "Increased durability of optical fiber through the use of compressive cladding," Optics Letters, May 1982, vol. 7, No. 5, pp. 241-243.

J. K. West et al., "Silica fracture Part II A ring opening model via hydrolysis," Journal of Materials Science, 1994, pp. 5808-5816, vol. 29.

* cited by examiner

*Primary Examiner* — Eric Wong
(74) *Attorney, Agent, or Firm* — Drinker Biddle & Reath LLP

(57) ABSTRACT

An optical fiber having excellent strength that can be manufactured at low cost, as well as a method for making such optical fiber, is provided. An optical fiber 1 is a silica-based optical fiber comprising a core 11, an optical cladding 12 surrounding the core 11, and a jacketing region 13 surrounding the optical cladding 12 and having a uniform composition throughout from the internal circumference to the outer circumference. A compressive strained layer having a residual compressive stress is provided at the outermost circumference of the jacketing region 13.

16 Claims, 14 Drawing Sheets (a)

(b)

(a)

(b)

(a)

(b)

OPTICAL FIBER AND METHOD OF MANUFACTURING OPTICAL FIBER

BACKGROUND OF THE INVENTION

1. Field of the Invention

The present invention relates to an optical fiber and a method of manufacturing the optical fiber.

2. Description of the Background Art

In accordance with the development of FTTH (Fiber To The Home), improvement in optical fiber installation efficiency has been in progress. In the installation of a FTTH system, it is often necessary to wire an optical fiber in a narrow duct or at a place available only for a small radius of curvature. Thus, optical fibers which do not cause light leakage even if they are bent have been developed, so that they can play a role of helping to enhance the efficiency of such installation. For example, there is a case in which an optical fiber is supposed to be bent at a radius of curvature of 5 mm for installation of a FTTH system, and accordingly an optical fiber which can allow such bending radius of curvature has been sought.

On the other hand, it is known that the long-term reliability of an optical fiber decreases when the optical fiber is subjected to bending at a small radius of curvature. Therefore, some techniques have been attempted such that the rigidity of a cable is strengthened to prevent optical fibers from bending substantially at a small radius of curvature or such that the elongation percentage of an optical fiber during a screening is made larger to enhance long-term reliability. However, both of such techniques not only result in increase of cost, but also become either a cause for decrease in the ease of handling optical fibers as a result of enhancing the rigidity of the cable or a cause for decrease in the strength of glass constituting the optical fiber as a result of increasing the tensile stress of such screening.

A method for enhancing the strength of an optical fiber itself is disclosed in Japanese Patent Application Publication No. H 2-27308. According to the method, the outer surface of the optical fiber is coated with carbon. Since such carbon coating is done using a hydrocarbon gas, additional facilities for exhausting the gas will be needed to manufacture such optical fibers. Also, it is difficult to achieve adherence between a carbon layer and a resin layer coated over the carbon layer. If a colored layer provided for identification has a light color, the colored layer will bear a darkish color because the carbon layer is black, and consequently the identification function of the colored layer will be degraded. Moreover, in order to ensure uniformity in the carbon coating over the entire length, it is necessary to monitor the condition of the coating layer by performing an additional inspection, for example such measurement of electric parameters using the conductivity of carbon layer as mentioned in the specification of U.S. Pat. No. 5,057,781.

Also, Japanese Patent Application Publication No. H4-65327 and Japanese Patent Application Publication No. H5-124831 disclose a method for enforcing glass by providing a glass layer, such as $TiO_2$-doped $SiO_2$ glass or F-doped $SiO_2$ glass whose viscosity is lower than that of $SiO_2$, so that the glass surface of an optical fiber is transformed into a compressive stress layer. However, with such a glass whose composition is significantly different from $SiO_2$, there is a case in which the diffusion of hydrogen easily tends to progress such that the network structure of glass is cut, resulting in degradation of breaking strength of glass in the long run because of decrease in the strength of the network structure of glass. Also, it is difficult to obtain desired optical properties since the refractive index differs from the value of $SiO_2$ because the composition is different. Besides, it will cause a cost increase because of an additional process needed for providing a layer having another different composition over the outermost layer.

The above-mentioned methods for enhancing the strength of an optical fiber itself, either the method of applying a carbon coating around the outside surface of glass or the method of making the outside surface of glass to be a glass having a viscosity lower than $SiO_2$, were both disadvantageous in terms of quality and manufacturing cost.

SUMMARY OF THE INVENTION

An object of the present invention is to provide an optical fiber having excellent strength that can be manufactured at low cost. Another object of the invention is to provide a method for making such optical fiber.

An embodiment provided to achieve such object is a silica-based optical fiber which includes a core, an optical cladding surrounding the core, and a jacketing region that surrounds the optical cladding and that has a uniform composition throughout from the internal circumference to the outer circumference, wherein a compressive strained layer having a residual compressive stress is provided at the outermost circumference.

The stress of the compressive strained layer in the optical fiber of the present invention is preferably a compressive stress of 10 MPa or more. Preferably, the compressive strained layer has a thickness that is equivalent to 30% or less of the outer diameter of the jacketing region. The static fatigue coefficient is preferably 20 or more. It is preferable that the breaking strength be 400 kgf/mm² or more when a tensile rate of 5 mm/min is applied. It is also preferable that the ratio (A490/A800) of 490 $cm^{-1}$ peak area A490 to 800 $cm^{-1}$ peak area A800 of Raman scattering spectrum at the outermost circumferential portion of the jacketing region be smaller than the ratio (A490/A800) at the core. The circumferential deviation of the compressive stress is preferably equal to or less than 10 MPa.

Another embodiment of the present invention is a method of manufacturing an optical fiber, comprising: (1) a fiber drawing step in which a glass filament having a desired outer diameter is formed by heating and fusing one end of a silica-based optical fiber preform that includes a core, an optical cladding surrounding the core, and a jacketing region surrounding the optical cladding; and (2) a stress imparting step in which the outer circumferential portion of the glass filament is re-heated to a temperature higher than a glass transition point after the temperature of the whole glass filament formed in the fiber drawing step has become lower than the glass transition point, and thereby a compressive strained layer is formed at the outermost circumferential portion of the jacketing region.

At the stress imparting step in the optical fiber manufacturing method according to the present invention, a glass filament may be heated by means of irradiation of laser beams output from one or more lasers, or the glass filament may be heated by an annular heating furnace surrounding the glass filament as its central axis, or the glass filament may be heated using a burner. Also, it is preferable to twist a glass filament in alternate directions around its central axis at the fiber drawing step. In addition, the deviation of temperature in the outer circumference of the glass filament during heating at the stress imparting step is preferably less than 50° C. Also, L1/V is preferably 0.003 second or more, and L2/V is preferably 1 second or less, where V is a line speed of the optical fiber, L1 is a length extending to the stress imparting unit from the position at which the outer diameter of the glass filament is decreased to 105% or less of the desired outer diameter, and L2 is the length of the stress imparting unit. The tension applied to the optical fiber glass at the stress imparting step is preferably 25 gms or more.

The optical fiber according to the present invention has excellent strength and can be manufactured at low cost. Also, the manufacturing method of the present invention enables manufacturing high-strength optical fibers at low cost.

DETAILED DESCRIPTION OF THE INVENTION

Figure 1:
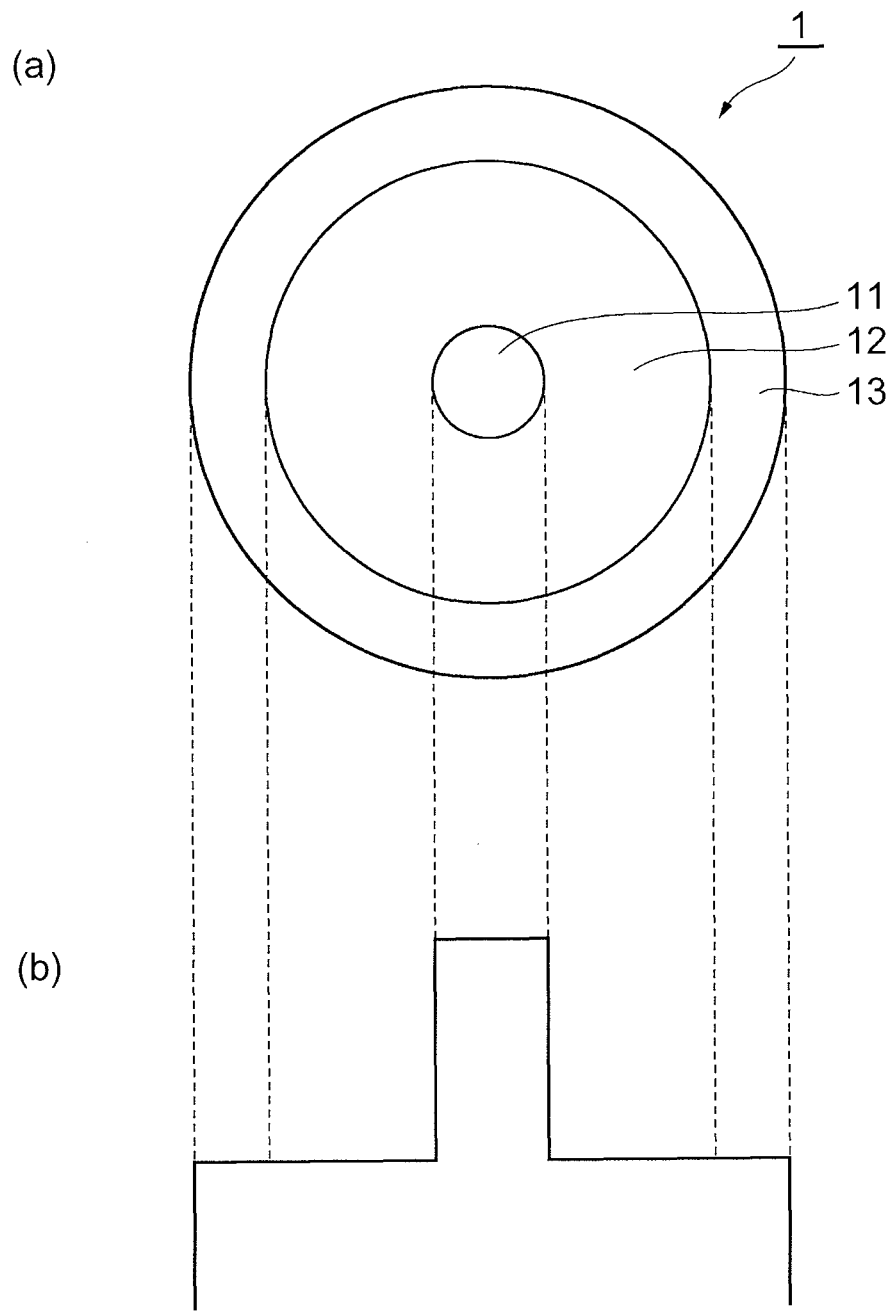
FIG. 1 shows an optical fiber relating to Embodiment 1 of the present invention: region ($a$) is a sectional view thereof; and region ($b$) is a refractive index profile thereof.

Hereinafter, preferred embodiments of the present invention will be described in reference to the accompanying drawings. The drawings are provided for the purpose of explaining the embodiments and are not intended to limit the scope of the invention. In the drawings, an identical mark represents the same element so that the repetition of explanation may be omitted. The dimensional ratios in the drawings are not always exact.

FIG. 1 shows an optical fiber 1 relating to Embodiment 1 of the present invention: region ($a$) is a sectional view thereof; and region ($b$) is a refractive index profile thereof. The optical fiber 1 is a silica-based optical fiber and includes a core 11, an optical cladding 12 that surrounds the core 11, a jacketing region 13 which surrounds optical cladding 12, and a protective coating layer which surrounds the jacketing region 13 (not shown in FIG. 1). The refractive index of the core 11 is higher than the refractive index of the optical cladding 12. The refractive index of jacketing region 13 may be either the same as or different from that of the optical cladding 12.

The refractive index may be uniform or varied in a radial direction in the core 11 and the optical cladding 12, respectively. There are occasionally cases where appropriate additives for increasing or decreasing the refractive index are added to the core 11 and the optical cladding 12, respectively. The respective concentration of the additives in the core 11 and the optical cladding 12 may be made non-uniform intentionally or by an unintentional manufacturing variation.

The jacketing region 13 is a region to which the electric field of core-guided mode light hardly reaches and which does not have any influence on the optical properties of the optical fiber 1. For example, the inside diameter of the jacketing region 13 (the outside diameter of the optical cladding 12) is equal to or more than three times the mode field diameter of the core-guided mode light. The jacketing region 13 is substantially uniform in composition from the internal circumferential part to the outer circumferential part. A compressive strained layer in which the compressive stress remains is formed at the outermost circumferential portion of the jacketing region 13.

In the optical fiber 1, the outermost circumferential portion of the jacketing region 13 having a substantially uniform composition is formed as a compressive strained layer, so that the optical fiber 1 has excellent strength, without causing such problems as caused by providing a conventional carbon coating or glass having different viscosity around the outer circumference thereof. Also, the optical fiber 1 according to the present invention can be manufactured at a low cost as in the case of a conventional optical fiber.

Figure 2:
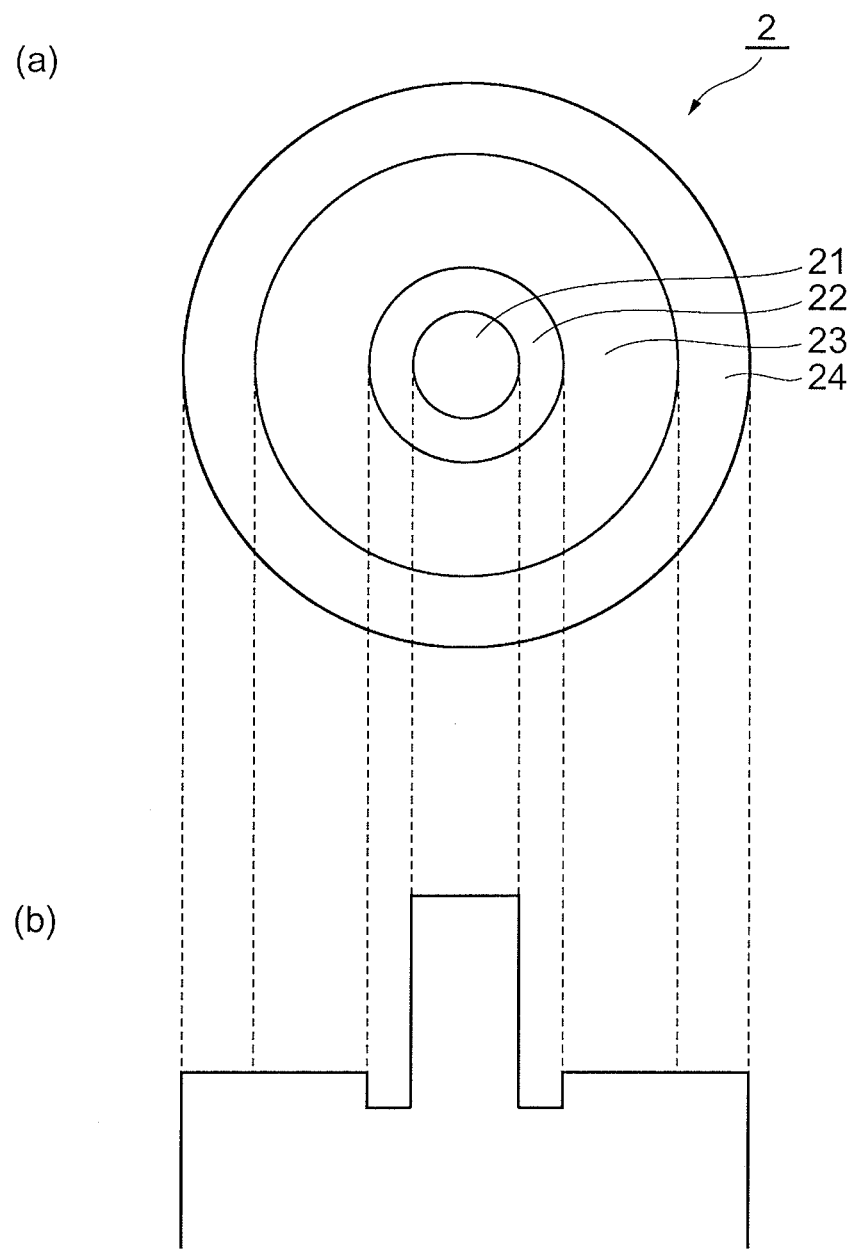
FIG. 2 shows an optical fiber relating to Embodiment 2 of the present invention: region ($a$) is a sectional view thereof; and region ($b$) is a refractive index profile thereof.

FIG. 2 shows an optical fiber 2 relating to Embodiment 2 of the present invention: region (a) is a sectional view thereof; and region ($b$) is a refractive index profile thereof. The optical fiber 2 is a silica-based optical fiber and includes a core 21, a depressed region 22 surrounding the core 21, a cladding 23 surrounding the depressed region 22, a jacketing region 24 surrounding the cladding 23, and a protective coating layer which surrounds the jacketing region 24 and is not shown in FIG. 2.

The optical cladding consists of the depressed region 22 and the cladding 23. When the refractive index of the core 21 is n21, and the refractive index of the depressed region 22 is n22, and the refractive index of the cladding 23 is n23, there is a relationship of n21>n23>n22 with respect to these refractive indexes. The refractive index of the jacketing region 24 may be the same as or different from the refractive index of the cladding 23.

The core 21, the depressed region 22, and the cladding 23 may have a uniform refractive index in a radial direction, respectively, or their respective refractive index may vary in a radial direction. There are cases in which appropriate additives for increasing or decreasing the refractive index are added to the core 21, the depressed region 22, and the cladding 23, respectively. In such cases, the concentration of the additives of the core 21, the depressed region 22, and the cladding 23 may be made non-uniform intentionally or by an unintentional variation of manufacture.

The jacketing region 24 is a region to which the electric field of core-guided mode light hardly reaches and which does not have an influence on the optical properties of the optical fiber 2. For example, the inside diameter of the jacketing region 24 (the outside diameter of the cladding 23) is equal to or more than three times the mode field diameter of core-guided mode light. The jacketing region 24 has a substantially uniform composition from the internal circumferential part to the outer circumferential part. A compressive strained layer in which a compressive stress remains is formed at the outermost circumferential portion of the jacketing region 24.

In the optical fiber 2, the outermost circumferential portion of the jacketing region 13 having a substantially uniform composition is formed as a compressive strained layer, so that the optical fiber 2 also has excellent strength, without causing such problems as caused by providing a conventional carbon coating or glass having different viscosity around the outer circumference thereof. Also, the optical fiber 2 according to the present invention can be manufactured at a low cost in substantially the same method as a method of manufacturing an ordinary optical fiber.

Figure 3:
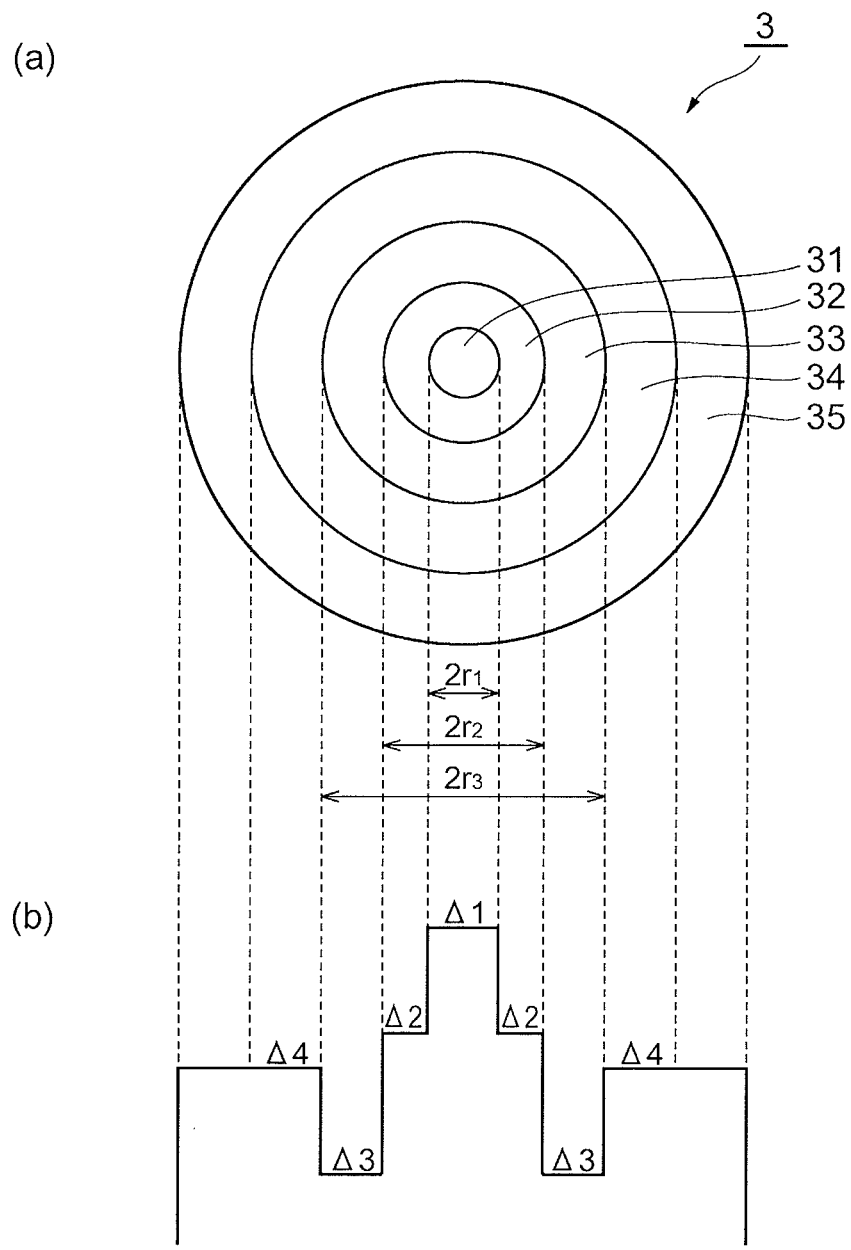
FIG. 3 shows an optical fiber relating to Embodiment 3 of the present invention: region ($a$) is a sectional view thereof; and region ($b$) is a refractive index profile thereof.

FIG. 3 shows an optical fiber 3 relating to Embodiment 3 of the present invention: region (a) is a sectional view thereof; and region (b) is a refractive index profile thereof. The optical fiber 3 is a silica-based optical fiber and includes a first core 31, a second core 32 surrounding the first core 31, a depressed region 33 surrounding the second core 32, a cladding 34 surrounding the depressed region 33, a jacketing region 35 surrounding the cladding 34, and a protective coating layer which surrounds the jacketing layer 35 and is not shown in FIG. 2.

The optical cladding consists of the depressed region 33 and the cladding 34. When the refractive index of the first core 31 is n31, and the refractive index of the second core 32 is n32, and the refractive index of the depressed region 33 is n33, and the refractive index of the cladding 34 is n34, there is a relationship of n31>n32>n34>n33 with respect to these refractive indexes. The refractive index of the jacketing region 35 may be the same as or different from the refractive index of the cladding 34.

The first core 31, the second core 32, the depressed region 33, and the cladding 34 may have a uniform refractive index or different refractive indexes in a radial direction, respectively. There are cases in which appropriate additives for increasing or decreasing the refractive index are added to the first core 31, the second core 32, the depressed region 33, and the cladding 34, respectively. In such cases, the concentration of the additives of the first core 31, the second core 32, the depressed region 33, and the cladding 34 may be made non-uniform intentionally or by an unintentional variation of manufacture.

The jacketing region 35 is a region to which the electric field of core-guided mode light hardly reaches and which does not have an influence on the optical properties of the optical fiber 3. For example, the inside diameter of the jacketing region 35 (the outside diameter of the cladding 34) is equal to or more than three times the mode field diameter of core-guided mode light. The jacketing region 35 has a substantially uniform composition from the internal circumferential part to the outer circumferential part. A compressive strained layer in which a compressive stress remains is formed at the outermost circumferential portion of the jacketing region 35.

Also in the optical fiber 3, the outermost circumferential portion of the jacketing region 35 having a substantially uniform composition is formed as a compressive strained layer, so that the optical fiber 3 has excellent strength, without causing such problems as caused by providing a conventional carbon coating or glass having different viscosity around the outer circumference thereof. Also, the optical fiber 3 according to the present invention can be manufactured at a low cost in substantially the same method as a method of manufacturing an ordinary optical fiber.

Figure 4:
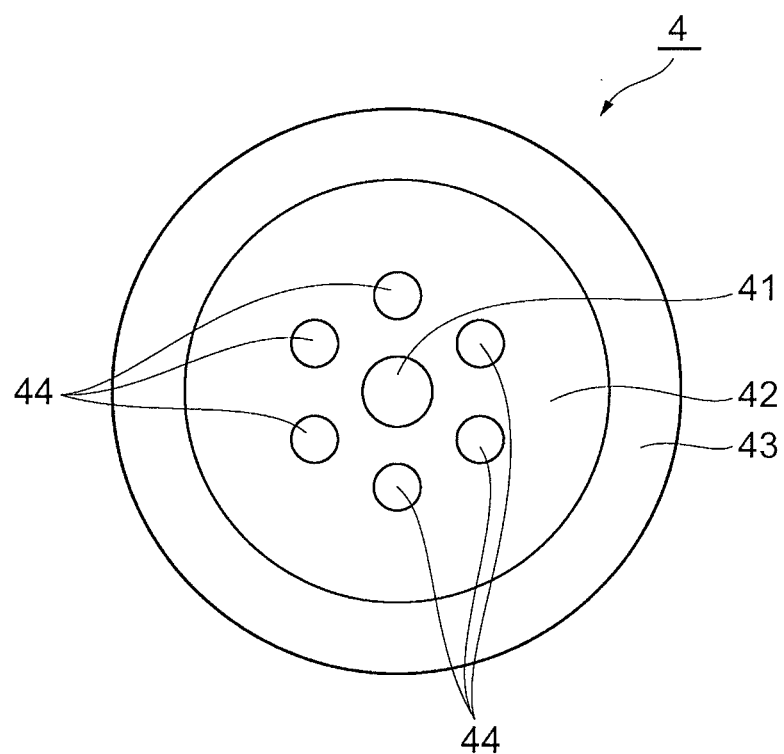
FIG. 4 is a sectional view illustrating an optical fiber relating to Embodiment 4 of the present invention.

FIG. 4 is a sectional view illustrating an optical fiber 4 relating to Embodiment 4 of the present invention. The optical fiber 4 is a silica-based holey fiber and includes a core 41, an optical cladding 42 surrounding the core 41, a jacketing region 43 surrounding the optical cladding 42, and a protective coating layer which surrounds the jacketing layer 43 and is not shown in FIG. 3. In the optical cladding 42, holes 44 are formed at vertexes of a regular hexagonal shape at a position in the main medium having the same composition as the core 41 such that the core 41 lies at the center of the hexagonal shape, whereby the effective refractive index of the optical cladding 42 is smaller than the refractive index of the core 41. The refractive index of the jacketing region 43 may be either the same as or different from the refractive index of the main medium of the optical cladding 42.

The jacketing region 43 is a region to which the electric field of core-guided mode light hardly reaches and which does not have an influence on the optical properties of the optical fiber 4. For example, the inside diameter of the jacketing region 43 (the outside diameter of the cladding 42) is equal to or more than three times the mode field diameter of core-guided mode light. The composition of the jacketing region 43 is substantially uniform from the internal circumferential part to the outer circumferential part. A compressive strained layer in which a compressive stress remains is formed at the outermost circumferential portion of the jacketing region 43.

In the optical fiber 4, the outermost circumferential portion of the jacketing region 43 having a substantially uniform composition is formed as a compressive strained layer, so that the optical fiber 4 has excellent strength, without causing such problems as caused by providing a conventional carbon coating or glass having different viscosity around the outer circumference thereof. Also, the optical fiber 4 according to the present invention can be manufactured at a low cost substantially in the same method as a method of manufacturing a usual holey optical fiber.

Optical fibers according to the present invention are not limited to those of Embodiments 1 to four. The optical fibers according to the invention may have any arbitrary refractive index profile at other regions, provided that the composition of their jacketing region is substantially uniform from the internal circumferential part to the outer circumferential part and that a compressive strained layer in which a compressive stress remains is formed at the outermost circumferential portion of the jacketing region.

Figure 5:
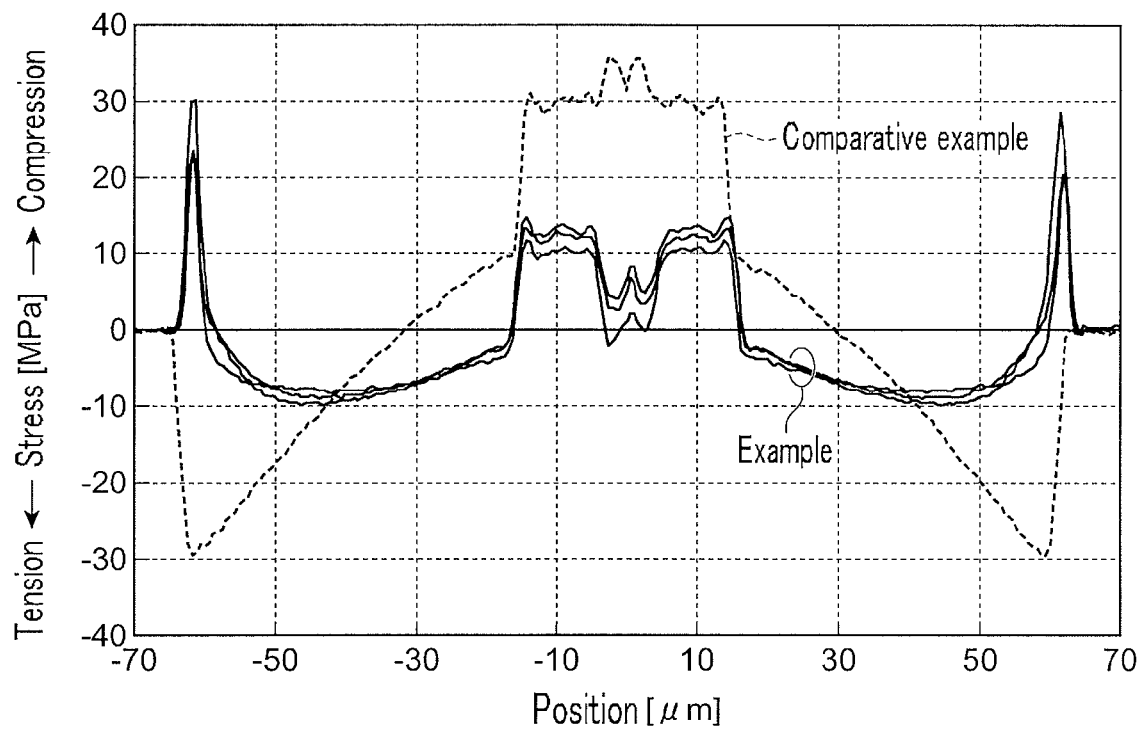
FIG. 5 is a graph showing examples of stress profiles of optical fibers relating to Embodiment 2, as well as a stress profile of Comparative example.

FIG. 5 is a graph showing three examples of stress profiles of an optical fiber 2, together with a stress profile of Comparative example which differs from the optical fiber 2 only in that no compressive strained layer is formed at the outermost circumferential portion of the jacketing region 13. In the optical fiber of Comparative example, a tensile stress remains at the vicinity of the outermost circumferential portion of the jacketing region. On the other hand, in the optical fiber 2, a compressive strained layer in which the compressive stress remains is formed at the outermost circumferential portion of the jacketing region. The optical fiber 2 has excellent strength because of such compressive strained layer.

The residual compressive stress in the compressive strained layer of the jacketing region is preferably 10 MPa or more, and thereby the glass strength can advantageously be enhanced. Preferably, the residual compressive stress in the compressive strained layer of the jacketing region is 30 MPa or more, and more preferably 100 MPa or more.

The thickness of the compressive strained layer of the jacketing region is preferably 30% or less relative to the outside diameter of the jacketing region, whereby the tensile strain afforded inside can be kept small, enhancing the glass strength. Also, it becomes easy to afford a compressive stress of 10 MPa or more to the outermost circumferential portion of the jacketing region.

Even in the case where a compressive strained layer in which a compressive stress remains is formed at the outermost circumferential portion of the jacketing region, it would be difficult to enhance the long-term reliability of the optical fiber if the static fatigue coefficient of the optical fiber is low. Therefore, it is desirable that the static fatigue coefficient of the optical fiber relating to the present invention be 20 or more. This will enable achieving desirable long-term reliability of the optical fiber. Preferably, the static fatigue coefficient of the optical fiber is 25 or more, and more preferably 30 or more. Also, it is preferable that the breaking strength of the optical fiber relating to the present invention be 400 kgf/mm$^2$ or more when a tensile rate of 5 mm/min is applied.

The circumferential deviation of the compressive stress of an optical fiber relating to the present invention is preferably 10 Mpa or less. This will allow a fiber curl to have a radius of curvature of 4 m or more. The measurement of a residual stress in an optical fiber can be done, for example, using the birefringence of the optical fiber as described in Japanese Patent Application Publication No. 2009-168813. Or, the measurement of the residual stress in the optical fiber can also be made from the variation quantity of refractive index and photoelastic coefficient inherent in the material by making a cross-sectional analysis of refractive indexes at a section of the optical fiber.

Figure 6:
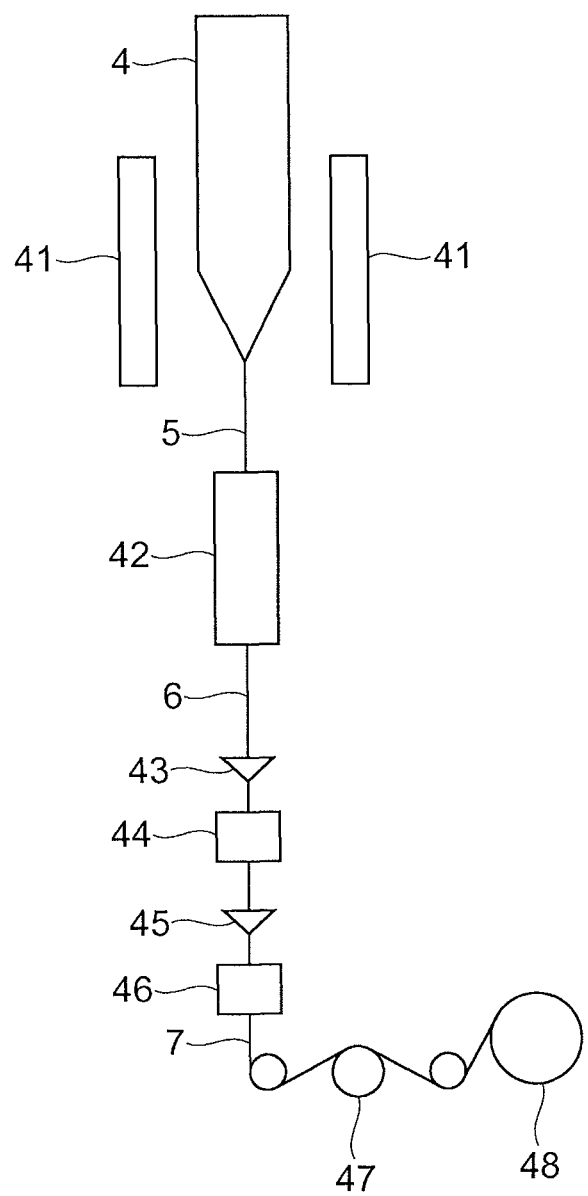
FIG. 6 is a conceptional schematic diagram illustrating an embodiment of optical fiber manufacturing method of the present invention.

In the following, a manufacturing method for an optical fiber according to the present invention will be described. FIG. 6 is a conceptional schematic diagram illustrating an embodiment of optical fiber manufacturing method of the invention. In an embodiment of optical fiber manufacturing method, first prepared is an optical fiber preform 4 having a refractive index profile that is equivalent to the cross-sectional structure of an optical fiber to be produced. That is, the optical fiber preform 4 is a silica-based preform and includes a core, an optical cladding surrounding the core, and a jacketing region surrounding the optical cladding. The optical fiber preform 4 can be prepared by an arbitrary method such as the VAD method, the OVD method, or the MCVD method.

The optical fiber preform 4 is vertically put into a drawing furnace 41, and one end (bottom end) thereof is fused by heating in the drawing furnace 41 so as to be drawn into a fiber. A glass filament 5 is formed by this fiber drawing step. The glass filament 5 has a desired outside diameter that is the same as the glass diameter of an optical fiber to be produced. At this fiber drawing step, it is preferable to perform drawing of the glass filament 5 by twisting it in alternate directions about the central axis thereof. By doing so, the circumferential homogeneity of the heating of the glass filament 5 will be increased at a later stress imparting step, and accordingly the given compressive stress will become circumferentially uniform.

The glass filament 5 formed at the fiber drawing step is inserted into a stress imparting unit 42 after the temperature of the whole body has become lower than the glass transition point. The glass filament 5 inserted into the stress imparting unit 42 is re-heated there until the temperature of the outermost circumferential portion of the jacketing region becomes higher than the glass transition point, and as a result of cooling this part, a compressive strained layer is formed at the outermost circumferential portion of the jacketing region. By this stress imparting step, an glass fiber 6 in which a residual compressive strained layer is formed at the outermost circumferential portion of the jacketing region is produced.

The glass fiber 6 produced by the stress imparting step is coated with an ultraviolet curable resin at a die 43, and thereafter such coating is hardened at a curing unit 44, resulting in a primary coating. In addition, an ultraviolet curable resin is applied at a die 45 and thereafter is hardened at a curing unit 46, resulting in a secondary coating. By this coating step, a coated optical fiber 7 is produced such that the circumference of the glass fiber 6 is covered with the primary coating and the secondary coating. The coated fiber 7 produced by the coating step is rolled up onto a bobbin 48 via a capstan 47.

Thus, an optical fiber of the present invention can be manufactured by an optical fiber manufacturing method of the invention. The optical fiber manufacturing method of the present invention is such that the stress imparting step (the compressive strained layer is formed by the stress imparting unit 42) is only added to the latter part of the fiber drawing step (the drawing is done by the drawing furnace 41) in a conventional optical fiber manufacturing method. With the method, an optical fiber can be manufactured by drawing an optical fiber preform 4 that is similar to a conventional preform. Therefore, the optical fiber manufacturing method relating to the present invention enables easily affording a compressive stress to the glass outer circumference without changing the glass composition constituting the jacket layer of an optical fiber, allowing easy and low-cost manufacture of the optical fiber having excellent strength.

Figure 7:
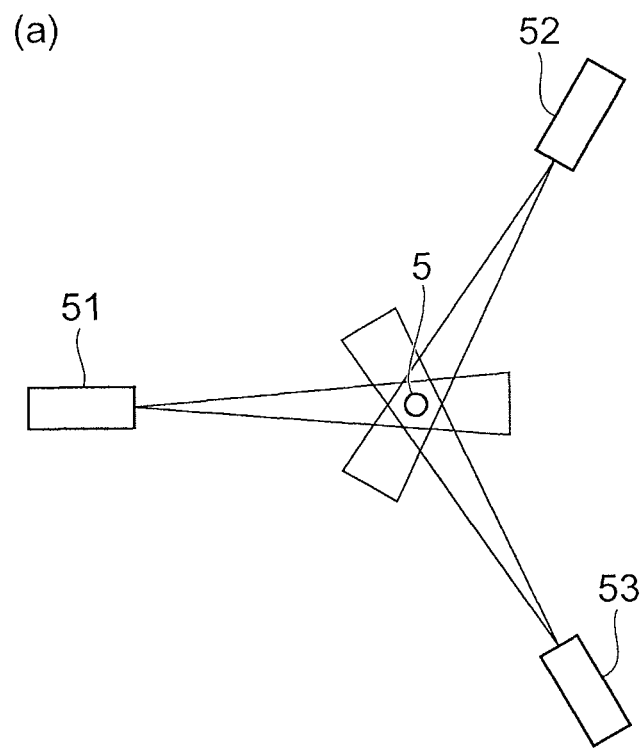
FIG. 7 shows a first example of stress imparting unit used at the stress imparting step in the optical fiber manufacturing method relating to the present invention: region ($a$) is a top view thereof; and region ($b$) is a side view thereof.
Figure 7:
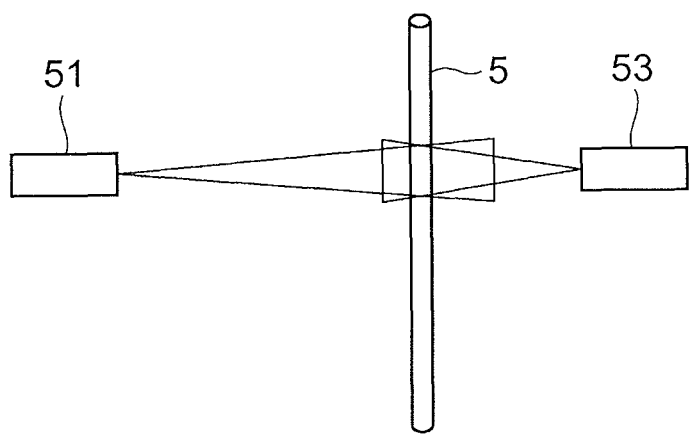

FIG. 7 shows a first example of stress imparting unit 42 used at the stress imparting step in the optical fiber manufacturing method relating to the present invention: region (a) is a top view thereof; and region (b) is a side view thereof. In the first example, a compressive strained layer is formed in the following manner: a glass filament 5 is heated to a temperature higher than the glass transition point by means of irradiation of laser beams output from lasers 51 to 53, and when this part is cooled, the compressive strained layer is formed at the outermost circumferential portion of the jacketing region. The number of lasers used in such case may be one, but it is preferable to use two or more lasers. When a plurality of lasers are used, the heating of the glass filament 5 is equalized and accordingly the quantity of afforded compressive stress is equalized around the outer circumference of the glass filament 5 since the laser beams output from the plurality of lasers are irradiated from different directions to the glass filament 5.

Figure 8:
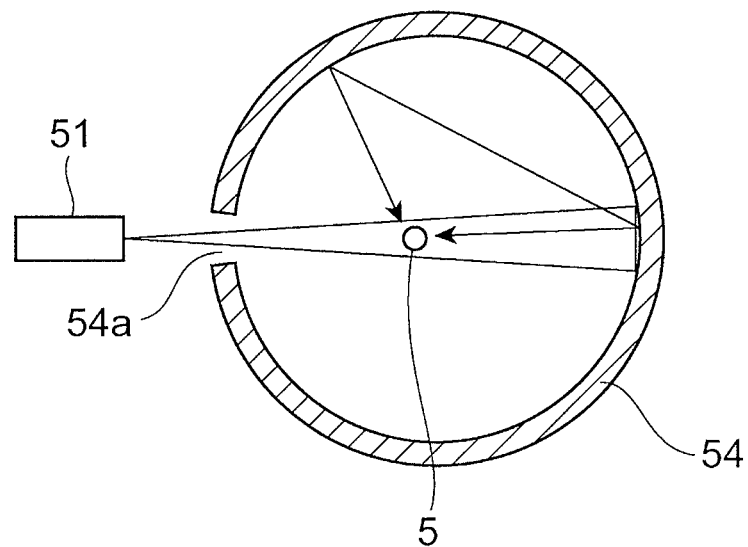
FIG. 8 shows a second example of stress imparting unit used at the stress imparting step in the optical fiber manufacturing method relating to the present invention: region ($a$) is a top view thereof; and region ($b$) is a side view thereof.
Figure 8:
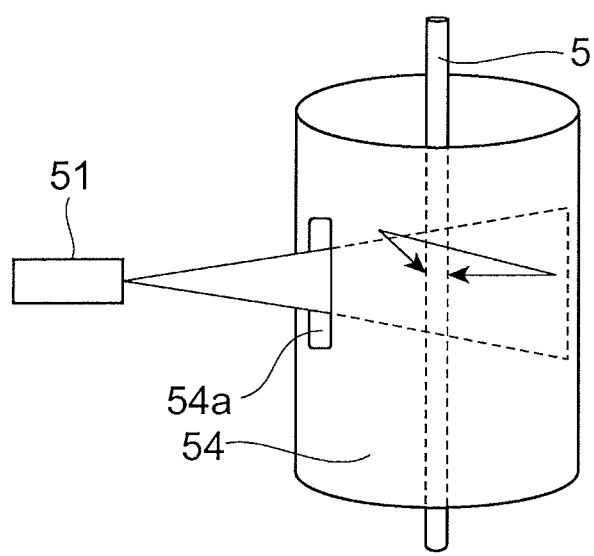

FIG. 8 shows a second example of stress imparting unit 42 used at the stress imparting step in the optical fiber manufacturing method relating to the present invention: region (a) is a top view thereof; and region (b) is a side view thereof. In the second example, laser beams output from the laser 51 are introduced into a tubular reflecting plate 54 via window 54a and partly irradiated to the glass filament 5 directly while the rest of the beams are irradiated to the glass filament 5 through reflection at the inner wall surface of the tubular reflecting plate 54. Preferably, the inner wall surface of the reflecting plate 54 has a reflectance of 70% or more at the wavelength of the laser beams, and is made of metal-plated quartz, alumina, metal, or the like. With such composition also, laser beams are irradiated from various directions to the glass filament 5, and consequently the heating is equalized around the outer circumference of the glass filament 5 and hence the quantity of the compressive stress afforded thereby is also equalized. In the second example also, a plurality of lasers may be used.

Figure 9:
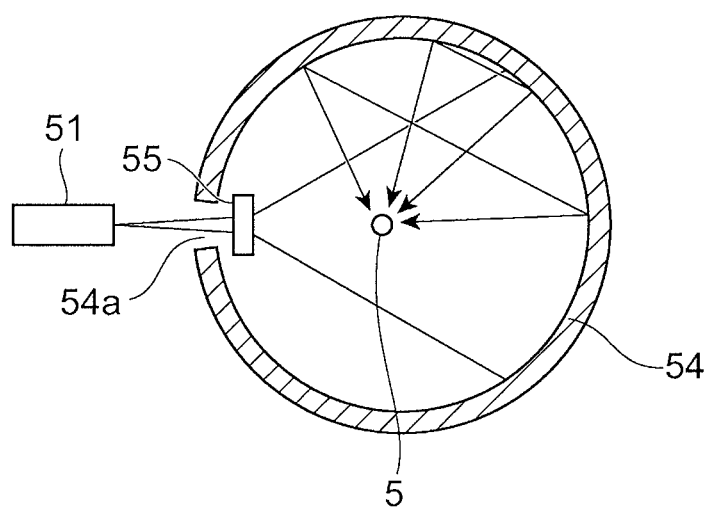
FIG. 9 shows a top view of a third example of stress imparting unit used at the stress imparting step in the optical fiber manufacturing method relating to the present invention.

FIG. 9 shows a top view of a third example of stress imparting unit 42 used at the stress imparting step in the optical fiber manufacturing method relating to the present invention. In the third example, a laser beam output from the laser 51 is introduced into the tubular reflecting plate 54 via the window 54a and diffused by a diffuser 55. Subsequently, a part of the diffused beam is directly irradiated to the glass filament 5 while the rest is irradiated to the glass filament 5 through reflection at the inner wall surface of the tubular reflecting plate 54. With such composition also, laser beams are irradiated from various directions to the glass filament 5, and consequently the heating is equalized around the outer circumference of the glass filament 5 and hence the quantity of the compressive stress afforded thereby is also equalized. Also, in the third example, a plurality of lasers may be used.

For the purpose of lasers 51 to 53 in the first to third examples, lasers capable of outputting a high-power infrared laser beam, such as a $CO_2$ laser or a copper-vapor laser, are suitably used, and also a laser which can output a CW laser beam is suitable. It is desirable to control laser beam strength by monitoring the temperature of the outer circumference of the glass filament 5 so as to obtain a desired temperature, so that an optical fiber having stable quality can be manufactured.

Figure 10:
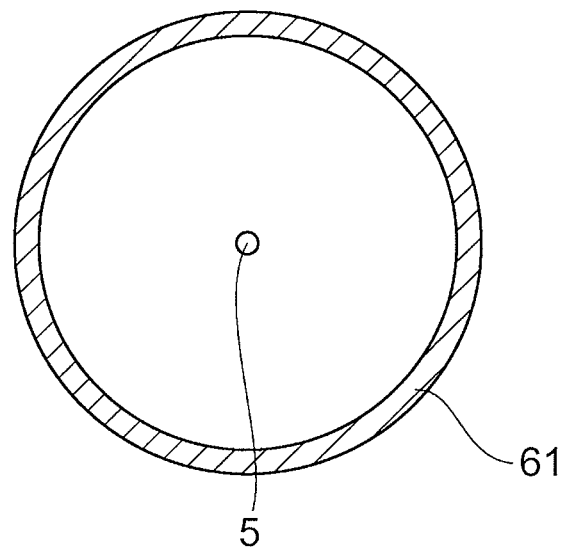
FIG. 10 shows a fourth example of stress imparting unit used at the stress imparting step in the optical fiber manufacturing method relating to the present invention: region ($a$) is a top view thereof; and region ($b$) is a side view thereof.
Figure 10:
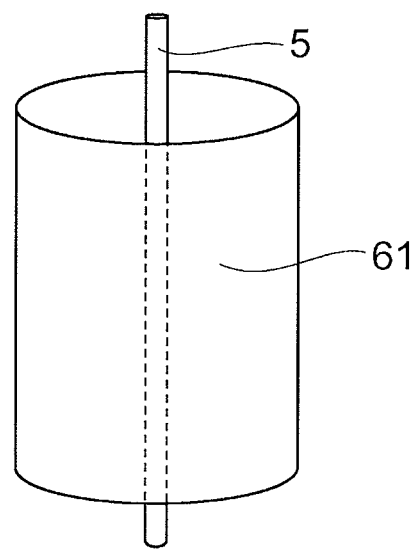

FIG. 10 shows a fourth example of stress imparting unit 42 used at the stress imparting step in the optical fiber manufacturing method relating to the present invention: region (a) is a top view thereof; and region (b) is a perspective view thereof. In the fourth example, the glass filament 5 is heated to a temperature higher than the glass transition point by a heating furnace 61, and when this part is cooled, a compressive strained layer is formed at the outermost circumferential portion of the jacketing region.

The heating furnace 61 is an annular furnace arranged to surround the glass filament 5 as its central axis, for example, such as Kanthal furnace, a resistance furnace, an induction furnace, or the like. It is preferable that the inside of the heating furnace 61 be filled with an inert gas such as $N_2$ gas, Ar gas, and He gas in a clean atmosphere. The heating furnace 61 preferably has a length of 100 mm or more so that the outermost circumferential portion of the glass filament 5 can be heated to a temperature higher than the glass transition point. Also, it is preferable to provide a mechanism for cooling the glass filament 5 that has come out of the heating furnace 61 upon being heated by the heating furnace 61, so that a stronger compressive stress can remain at the outer circumferential portion of the glass fiber 6.

Figure 11:
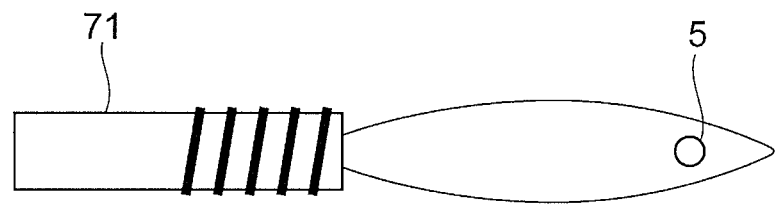
FIG. 11 shows a top view of a fifth example of stress imparting unit used at the stress imparting step in the optical fiber manufacturing method relating to the present invention.

FIG. 11 shows a top view of a fifth example of stress imparting unit 42 used at the stress imparting step in the optical fiber manufacturing method relating to the present invention. In the fifth example, the glass filament 5 is heated by a burner 71 to a temperature higher than the glass transition point, and when this part is cooled, a compressive strained layer is formed at the outermost circumferential portion of the jacketing region. The burner 71 is one that can heat the glass filament 5 to a temperature higher than the glass transition point (about 1100° C.), such as a plasma burner, an oxyhydrogen burner, or a methane burner, for example. However, the flame is preferably an anhydrous one, because otherwise the long-term glass strength may not be assured if an OH group adheres to the surface of the glass filament 5. Also, from the viewpoint of preventing the glass filament 5 from shaking (line sway), the burner 71 is preferably a plasma burner that generates comparatively small wind pressure.

Figure 12:
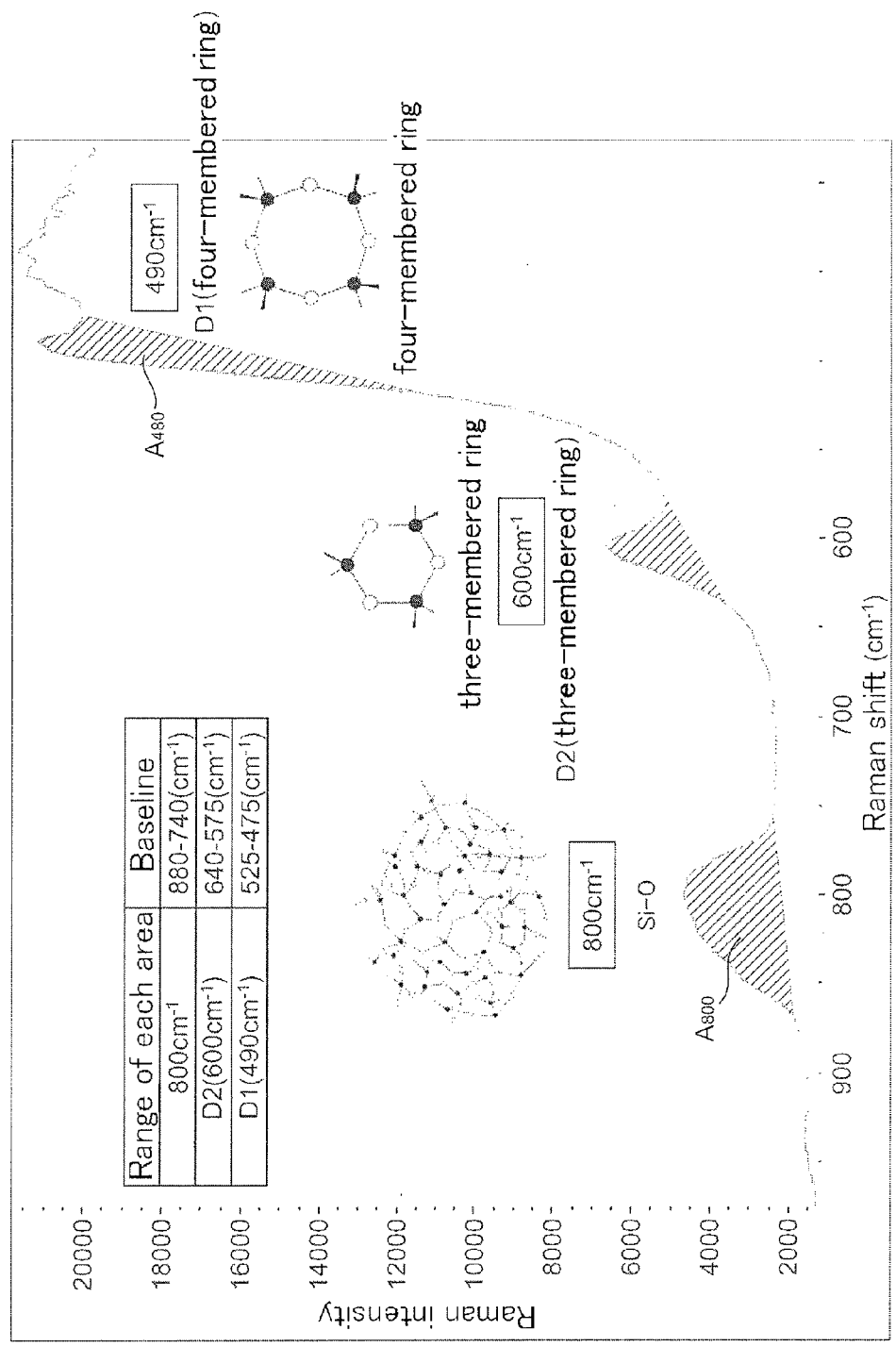
FIG. 12 is a graph illustrating Raman scattering spectrum of silica glass and 800 $cm^{-1}$ peak area A800 and 490 $cm^{-1}$ peak area A490 of the spectrum.

FIG. 12 is a graph illustrating a Raman scattering spectrum of silica glass and 800 cm$^{-1}$ peak area A800 and 490 cm$^{-1}$ peak area A490 of the spectrum. The peak area A800 is an area of the region between the spectrum of Raman scattering and the baseline drawn from wave number 880 to 740 cm$^{-1}$ and corresponds to the quantity of $SiO_2$ glass network composed of six-membered ring. The peak area A490 is an area of the region between the spectrum of Raman scattering and the baseline drawn from wave number 525 to 475 cm$^{-1}$ and corresponds to the quantity of a strained structure composed of four-membered ring.

A known model of glass breakage is such that strained structures such as three-membered ring and four-membered ring that are generally inherent in the $SiO_2$ glass network composed of six-membered ring are selectively hydrolyzed, leading to breakage (J. K. West et al., "Silica fracture Part II A ring opening model via hydrolysis", Journal of Materials Science 29 (1994) 5808-5816). Therefore, it is desired that the absolute quantity of three-membered ring and four-membered ring are lessened to increase the breaking strength of glass.

Figure 13:
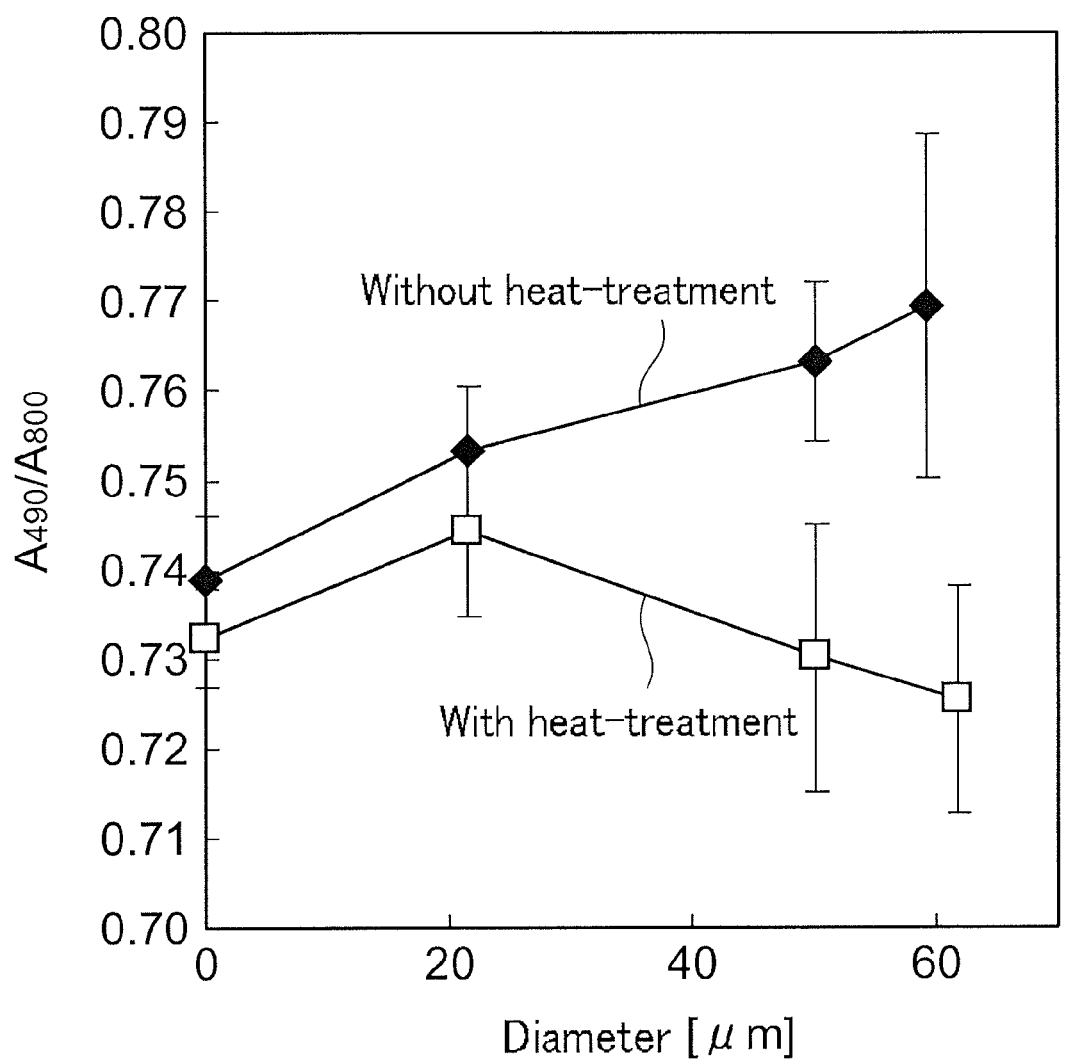
FIG. 13 is a graph showing the ratio (A490/A800) at each position in a section of an glass fiber, in the case where the heat treatment of a glass filament is performed and in the case where the heat treatment of a glass filament is not performed, respectively.

FIG. 13 is a graph showing the ratio (A490/A800) at each position in a section of an glass fiber 6, in the case where the heat treatment of a glass filament 5 is performed and in the case where the heat treatment of the glass filament 5 is not performed, respectively. (The spectrum of Raman scattering at each position in the section of an optical fiber can be measured by scanning pump light having a beam diameter of 5 μm in a radial direction in the section.) The ratio (A490/A800) at the outermost circumferential portion of the jacketing region was made smaller than the ratio (A490/A800) at the core by performing a heat treatment at a temperature below (Tg+500° C.) and above the glass transition point Tg. In the case where a heat treatment was performed, the breaking strength of the optical fiber in a tensile test at a strain rate of 1%/min increased by 11% as compared with the case where no heat treatment was performed. As described above, it is possible to enhance the breaking strength of the optical fiber by conducting a heating of the glass filament 5 at a temperature below (Tg+500° C.) and above the glass transition point Tg.

EXAMPLES

Three optical fibers (Example 1 to 3) were prepared experimentally as the optical fiber 3 relating to Embodiment 3 by the optical fiber manufacturing method of the present invention, and optical characteristics (mode field diameter at a wavelength of 1.31 μm, 2 m cutoff wavelength, 22 m cable cutoff wavelength, zero dispersion wavelength, and bend loss at each bending diameter), residual compressive stresses in the optical fibers, and breaking strengths were obtained. As shown in FIG. 3, based on the refractive index of pure silica glass, the relative refractive index difference at a first core 31 is expressed as $\Delta 1 = (n_{31} - n_{SiO_2})/n_{SiO_2}$, the relative refractive index difference at a second core 32 is expressed as $\Delta 2 = (n_{32} - n_{SiO_2})/n_{SiO_2}$, the relative refractive index difference at a depressed region 33 is expressed as $\Delta 3 = (n_{33} - n_{SiO_2})/n_{SiO_2}$, and the relative refractive index difference at a cladding 34 is expressed as $\Delta 4 = (n_{34} - n_{SiO_2})/n_{SiO_2}$. The outside diameter of a first core 31 is expressed by $2r_1$, the outside diameter of a second core 32 is expressed by $2r_2$, and the outside diameter of a depressed region 33 is expressed by $2r_3$. Ra is a ratio ($r_1/r_2$), and Rb is a ratio ($r_2/r_3$). The compressive stress was measured with a technique for detecting polarization rotation by photoelastic effect, and the average breaking strength was obtained by applying a tensile rate of 5 mm/min to a testing optical fiber of 500 mm in length.

Table shows specifications of optical fibers in Examples 1 to 3.

TABLE

|  |  |  | Example 1 | Example 2 | Example 3 |
|---|---|---|---|---|---|
| Refractive index structure | Δ1 | % | 0.3 | 0.35 | 0.35 |
|  | Δ2 | % | 0.025 | 0.025 | 0.025 |
|  | Δ3 | % | −0.7 | −0.6 to −0.5 | −0.7 |
|  | Δ4 | % | 0.025 | 0.025 | 0.025 |
|  | r1 | μm | 4 | 4 | 4 |
|  | r2 | μm | 6.6667 | 9.30233 | 8.16327 |
|  | r3 | μm | 12.4611 | 15.5039 | 12.184 |
|  | Fiber diameter | μm | 125 | 125 | 125 |
|  | Ra (r1/r2) |  | 0.6 | 0.43 | 0.49 |
|  | Rb (r2/r3) |  | 0.535 | 0.6 | 0.67 |
| Properties | MFD @1.31 μm | μm | 8.6 | 8.6 | 8.6 |
|  | 2 m cutoff wavelength | nm | 1400 | 1400 | 1400 |
|  | 22 m cutoff wavelength | nm | <1260 | <1260 | <1260 |
|  | Zero dispersion wavelength | nm | <1300 | 1300 to 1324 | <1300 |
|  | Bend loss @R5 mm | dB/turn | <0.1 | <0.1 | <0.1 |
|  | Bend loss @R7.5 mm | dB/turn | <0.08 | <0.08 | <0.08 |
|  | Bend loss @R10 mm | dB/turn | <0.03 | <0.03 | <0.03 |
|  | Bend loss @R5 mm | dB/turn | <0.45 | <0.45 | <0.45 |
|  | Bend loss @R7.5 mm | dB/turn | <0.25 | <0.25 | <0.25 |
|  | Bend loss @R10 mm | dB/turn | <0.1 | <0.1 | <0.1 |
|  | Compressive stress | MPa | 16 | 29 | 46 |
|  | Breaking strength | kgf | 5.62 | 5.95 | 6.35 |

The optical fibers of Examples 1 to 3 had satisfactory optical properties, even if they were afforded with compressive stress at their outer circumferential portion. In the case of an optical fiber in which the viscosity of the core is lower than that of the jacketing region, a compressive stress remains at the core after drawing. On the other hand, the compressive stress at the core decreases as a result of a compressive stress being afforded around the outer circumference. If an excessive compressive stress is afforded to the outer circumference, a tensile stress sometimes works at the core. When a compressive stress works at the core, attenuation increases. Therefore, it is preferable to adjust heating conditions and tension, so that a compressive stress may remain at the core while affording a tensile stress to the core. However, in the case of application at a short transmission distance where the attenuation does not matter, it is possible to strengthen an optical fiber by increasing the compressive stress to the outer circumferential portion, without regard to the stress at the core.

Figure 14:
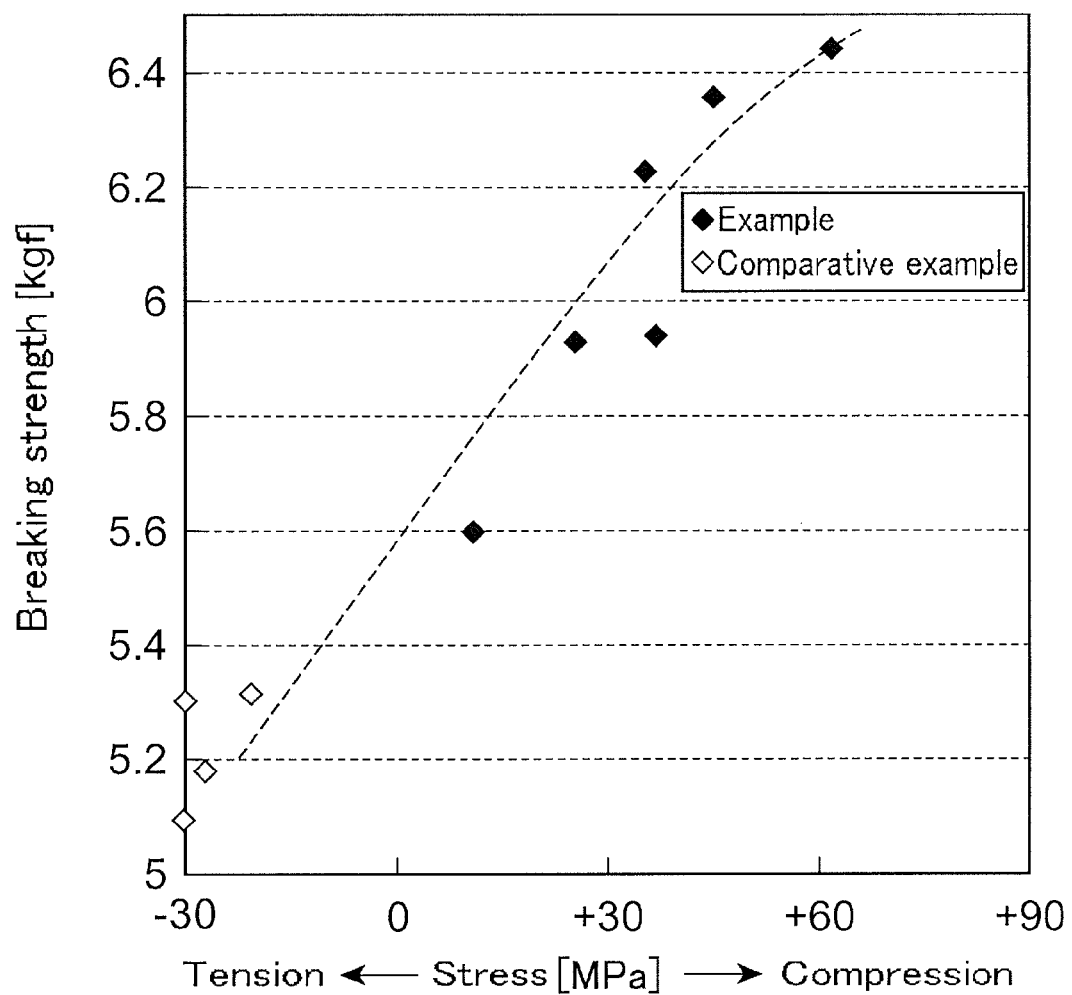
FIG. 14 is a graph showing the relationship between a residual stress and a breaking strength in an optical fiber.

FIG. 14 is a graph showing the relationship between a residual stress and a breaking strength in an optical fiber. In FIG. 14, additional examples are shown in addition to Examples 1 to 3. As shown in FIG. 14 the larger the compressive stress at the outer circumference of the jacket, the better, because if the compressive stress is larger, the breaking strength becomes higher.

The optical fiber relating to the present invention can have an arbitrary cross-sectional structure other than those of Embodiments 1 to 4. Particularly, in an optical fiber having a trench-type profile or a similar profile, less optical leakage occurs even if it is bent. Therefore, an optical fiber having such type of profile can advantageously be used for increasing the efficiency of housing and installation work of FTTx because it is highly reliable in terms of stress given during the installation work and storage.

Also, the optical fiber relating to the present invention can suitably be used for submarine applications. Optical fibers installed on the sea bottom are difficult to repair, and therefore they are required of particularly long-time reliability. Optical fibers relating to the present invention are preferable because they are highly reliable with respect to stress. Optical fibers having a W-type refractive index profile of Embodiment 2 and those having a trench-type profile of Embodiment 3 are suitable for submarine applications.

The temperature of an optical fiber at the time of entering into the die 43 for application of a resin is preferably 30° C. or higher. In such case, the condensation reaction between the glass and a silane coupling material contained in the resin is accelerated, and hence the strength of glass can be expected to further increase.

In the optical fiber manufacturing method relating to the present invention, the deviation of temperature at the outer circumference of the optical fiber during heating for the stress imparting step is preferably less than 50° C. By heating in such manner, the circumferential deviation of the compressive stress can be made equal to or less than 10 MPa. The temperature of an optical fiber under drawing can be evaluated by observing the optical fiber under drawing from a plurality of angles with a pyrometer in which infrared light is used.

In the optical fiber manufacturing method relating to the present invention, preferably L1/V is equal to or more than 0.003 second, and L2/V is equal to or less than 1 second, where L1 represents the length to the stress imparting unit L1 from the position at which the outside diameter of the optical fiber is decreased to 105% or less of desired outer diameter, L2 represents the length of the stress imparting unit, and V represents the line speed of the optical fiber. It is possible to make the temperature of the optical fiber to be below the glass transition point by setting the cooling time of the optical fiber such that L1/V>0.003 second holds. In addition, by limiting the heating time, the viscosity decreasing part can be limited to the outer circumference of the optical fiber only, thereby enabling production of an optical fiber in which the compressive stress is afforded only to the outer circumference of the optical fiber. More preferably, L2/V is 0.5 second or less, and further more preferably, L2/V is 0.1 second or less.

In the optical fiber manufacturing method relating to the present invention, the tension given to the optical fiber glass at the stress imparting step is preferably 25 gms or more. The larger the tension given to the optical fiber, the larger the compressive stress remaining at the outer circumference of the optical fiber. By so making the tension to be 25 gms or more, the compressive stress can be easily afforded, enabling significant improvement in the strength of the optical fiber over an optical fiber to which no compressive stress is afforded. More preferably, the tension is 50 gms or more.

As described above, the present invention makes it possible to provide a residual compressive stress selectively only at the outside surface of the glass, notwithstanding an ordinary glass having a common glass composition is used as it is without adhering any particular material to the outside surface of glass, provided that the glass composition has been proved to be satisfactory in terms of optical properties. As a result, because tensile stress given to the optical fiber is canceled by the residual compressive stress, thereby restraining any flaw of the optical fiber surface from growing, it is possible to obtain an optical fiber in which its strength is enhanced. Thus, according to the present invention, it is possible to significantly improve the reliability of the optical fiber easily without having an adverse influence on the manufacturing cost while conquering the problems of the conventional methods that have been contrived to strengthen an optical fiber.

Thus, the optical fibers of the present invention can be used for wiring of FTTx or optical fibers installed on the sea bottom.

What is claimed is:

1. A silica-based optical fiber comprising a core, an optical cladding surrounding the core, and a jacketing region surrounding the optical cladding and having a uniform composition throughout from the internal circumference to the outer circumference thereof, wherein the jacketing region has a compressive strained layer having a residual compressive stress at the outermost circumference of the jacketing region and a tensile strained layer surrounded by the compressive strained layer.

2. An optical fiber according to claim 1, wherein the stress of the compressive strained layer is a compressive stress of 10 MPa or more.

3. An optical fiber according to claim 1, wherein the compressive strained layer has a thickness equivalent to 30% or less of the outer diameter of the jacketing region.

4. An optical fiber according to claim 1, wherein the static fatigue coefficient is 20 or more.

5. An optical fiber according to claim 1, wherein the breaking strength is 400 kgf/mm² or more when a tensile rate of 5 mm/min is applied.

6. An optical fiber according to claim 1, wherein the ratio (A490/A800) of 490 cm$^{-1}$ peak area A490 to 800 cm$^{-1}$ peak area A800 of Raman scattering spectrum at the outermost circumferential portion of the jacketing region is smaller than the ratio (A490/A800) at the core.

7. An optical fiber according to claim 1, wherein the circumferential deviation of the compressive stress is 10 MPa or less.

8. A method of manufacturing an optical fiber, the optical fiber being according to claim 1, comprising: a fiber drawing step wherein a glass filament having a desired outer diameter is formed by heating and fusing one end of a silica-based optical fiber preform including a core, an optical cladding surrounding the core, and a jacketing region surrounding the optical cladding; and a stress imparting step wherein the outer circumferential portion of the glass filament is re-heated with a stress imparting unit to a temperature higher than a glass transition point after the temperature of the whole glass filament formed in the fiber drawing step has become lower than the glass transition point, and thereby a compressive strained layer is formed at the outermost circumferential portion of the jacketing region.

9. An optical fiber manufacturing method according to claim 8, wherein the glass filament is heated by means of irradiation of laser beams output from one or more lasers.

10. An optical fiber manufacturing method according to claim 8, wherein the glass filament is heated by an annular heating furnace surrounding the glass filament as its central axis.

11. An optical fiber manufacturing method according to claim 8, wherein the glass filament is heated using a burner.

12. An optical fiber manufacturing method according to claim 8, wherein at the drawing step the glass filament fiber is drawn while being twisted in alternate directions about the central axis thereof.

13. An optical fiber manufacturing method according to claim 8, wherein the deviation of temperature in the outer circumference of the glass filament during heating at the stress imparting step is less than 50° C.

14. An optical fiber manufacturing method according to claim 8, wherein L1N is 0.003 second or more, and L2/V is 1 second or less, where V is a line speed of an optical fiber, L1 is a length extending to the stress imparting unit from the position at which the outer diameter of the glass filament is decreased to 105% or less of the desired outer diameter, and L2 is the length of the stress imparting unit.

15. An optical fiber manufacturing method according to claim 8, wherein tension applied to the optical fiber glass at the stress imparting step is 25 gms or more.

16. An optical fiber according to claim 1, wherein the core has a compressive stress.

* * * * *

UNITED STATES PATENT AND TRADEMARK OFFICE
CERTIFICATE OF CORRECTION

PATENT NO.       : 8,676,014 B2
APPLICATION NO.  : 12/903798
DATED            : March 18, 2014
INVENTOR(S)      : Tetsuya Nakanishi et al.

It is certified that error appears in the above-identified patent and that said Letters Patent is hereby corrected as shown below:

Item (75) "Inventors" on the title page of the above-identified patent, change "Maki Ikechi" to --Maki IKEJI--

Signed and Sealed this
Tenth Day of June, 2014

Michelle K. Lee
*Deputy Director of the United States Patent and Trademark Office*